Nov. 12, 1935.  E. J. FARKAS  2,020,404

TRANSMISSION

Filed Sept. 29, 1930   2 Sheets-Sheet 1

Witness.
C. C. McRae.

INVENTOR.
E. J. Farkas
BY
ATTORNEY.

Nov. 12, 1935.   E. J. FARKAS   2,020,404

TRANSMISSION

Filed Sept. 29, 1930   2 Sheets-Sheet 2

INVENTOR.
E. J. Farkas
BY
ATTORNEY.

Patented Nov. 12, 1935

2,020,404

UNITED STATES PATENT OFFICE 2,020,404

TRANSMISSION

Eugene J. Farkas, Detroit, Mich., assignor to Ford Motor Company, Dearborn, Mich., a corporation of Delaware Application September 29, 1930, Serial No. 484,955

6 Claims. (Cl. 188—77)

The object of my invention is to provide a transmission of the planetary type wherein a novel transmission band is employed for stopping the various speed controlling brake drums of the transmission. In this transmission, as well as in the conventional planetary type, a plurality of drums are so arranged and connected to the various sun gears, planet carriers and internal gears that the stopping of any drum while the device is in operation will effect a definite reduction in the ratio of the driven to the driving transmission shafts. It has been customary with the ordinary planetary transmission to provide flat drums having flat metal bands disposed around the outsides thereof, these bands being provided with fabric linings so that when the bands are selectively clamped around the outside of the drums the friction produced therebetween will stop the respective drum from rotation.

It is well known that such bands require great force to clamp the drums against rotation. Generally speaking, the torque of these drums increase in proportion to the speed reduction obtained thereby so that the first and reverse speed drums of an automobile transmission have a torque of four to five times the engine torque. The purpose of my improved transmission band is to positively stop these drums from rotation with very little effort on the part of the operator. These transmission bands are so constructed that they tend to grip their respective brake drums all of the time independently of any auxiliary force which gripping action may be easily controlled by the operator of the car.

The novel transmission band herein disclosed more positively stops these brake drums and accomplishes this with very little effort on the part of the operator.

Still a further object of my invention is to provide a transmission band which will be entirely self-energizing so that no pressure need be applied to the band to operate same. A serious disadvantage of the conventional transmission band arises because of the high pressure which must be applied to the band to insure its stopping its brake drum. My improved band is so constructed that in its free position it grips the brake drum against rotation, there being sufficient length to the band to fully energize same. Thus, only a small pressure is required to release the band from the drum. This is an important feature in connection with this device for in the ordinary transmission band a high pressure must be applied to the band to grip its brake drum.

Still a further object of my invention is to provide a transmission band of the class described which will grip the brake drum so that no bending strains will be induced into the bearings or central shafts of the transmission. It will readily be seen that when a transmission band is clamped around a drum and the ends held against rotation, a bending strain is induced in the axis of the drum tending to rotate the drum around the point at which the band is held which strain is detrimental to the transmission bearings.

In my device two bands are employed around each drum which are anchored at opposite sides thereof so that the bending strains induced by each band neutralize each other thereby eliminating the excessive wear on the bearings usually caused by the stopping of such drums.

Still a further object of my invention is to provide means for insuring uniform clearance between the bands and their drums when the former are in their released positions so that no drag will be imposed on the transmission. I accomplish this desirable result by machining four stops in the interior of the transmission case spaced around the drums against which the outer faces of the bands bear when they are released. Thus, a positive clearance of only a fraction of an inch may be had which assists in providing an easily operated device.

With these and other objects in view, my invention consists in the arrangement, construction, and combination of the various parts of my improved device, as described in the specification, claimed in my claims, and illustrated in the accompanying drawings, in which:

Figure 1:
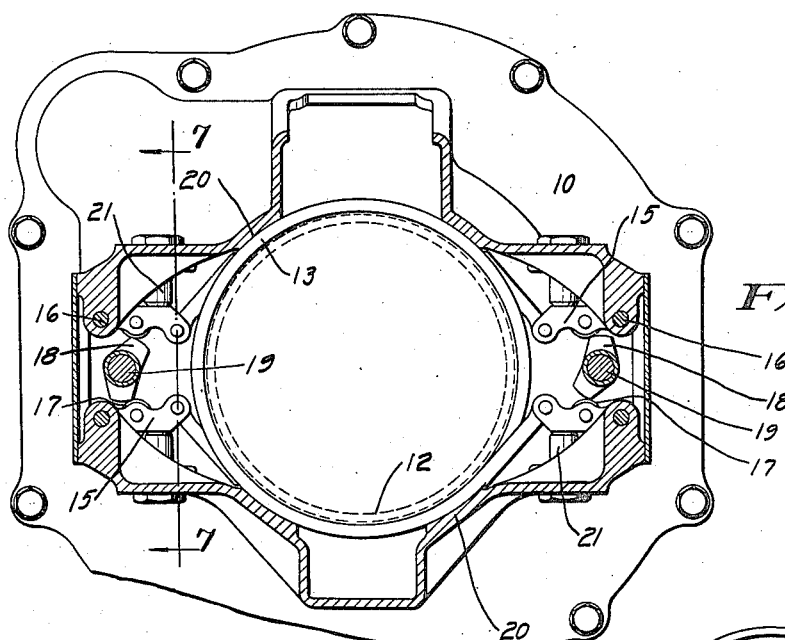
Figure 1 shows a transverse sectional view through a planetary transmission having my improved transmission bands installed thereon.

Referring to the accompanying drawings, I have used the reference numeral 10 to indicate a transmission housing usually associated with an automobile engine. A planetary transmission, shown by dotted lines 11, is rotatably mounted in the ordinary manner in the housing 10, this transmission being provided with three brake drums 12 which may be selectively held from rotation to effect the various reduced speeds of the transmission. I have not shown the gearing of the transmission in detail as it forms no part of this invention and as any type of planetary gearing may be used as long as it requires the holding from rotation of certain members to effect the various speed reductions therein.

It is preferable to connect the main drive shaft of the transmission to the engine through a conventional disc clutch so that the transmission drums may be instantly stopped when the clutch is thrown out and when the clutch is then engaged it will absorb the friction incidental to starting up the car. No particular difficulty is encountered in the operation of such a clutch for the reason that a clutch pedal may be employed, as in the conventional transmission, and the bands selectively operated through a lever similar to the ordinary gear shift lever.

My improved brake band consists of a helical spring steel band 13 having substantially three wraps around the brake drum. The ends of this band are provided with eyes 14 so that by spreading these eyes the diameter of the coil will be slightly increased and inversely by drawing these eyes together the diameter of the coil will be reduced. Each of the eyes 14 is pivotally secured to the free ends of arms 15 which are pivotally mounted at 16 in the transmission case 10. The intermediate portions of the arms 15 are provided with rollers 17 against which operating cams 18 co-act to spread the arms 15. These cams 18 are mounted on a cam shaft 19 so that rotation of the shaft 19 will selectively spread the pairs of arms 15 thereby spreading the eyes 14 to release the band 13.

I have provided four stops 20 machined in the interior of the transmission case 10 and spaced around the band 13 so that when the cam shaft 19 is operated to spread the eyes 14 the diameter of the band 13 will increase sufficiently to engage all of the stops 20 thereby centering the band around the brake drum 12, thus insuring uniform clearance between the drum and the band. In this manner, I am able to eliminate the drag of the band on the drum while at the same time only increasing its diameter a fraction of an inch.

Figure 2:
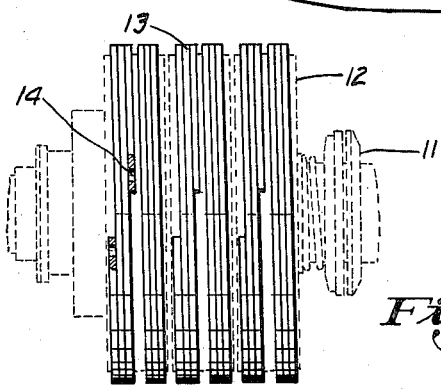
Figure 2 shows a side of the transmission band, shown in Figure 1.
Figure 6:
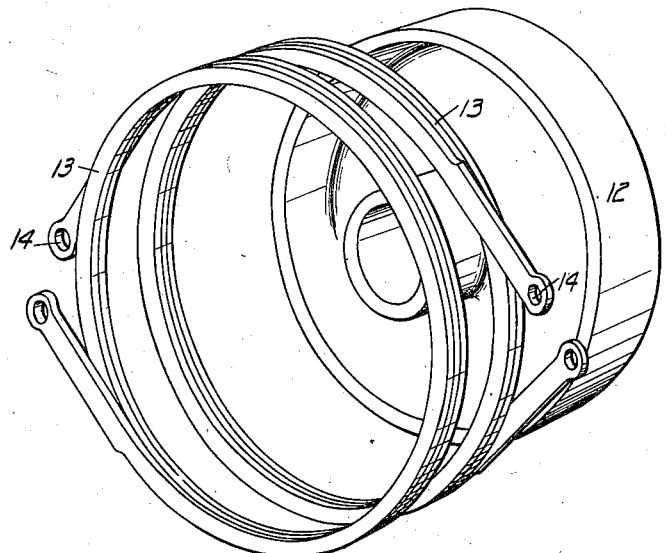
Figure 6 is a perspective view of one transmission drum and a pair of bands associated therewith, there being three of these drum and band units in the completed transmission.
Figure 7:
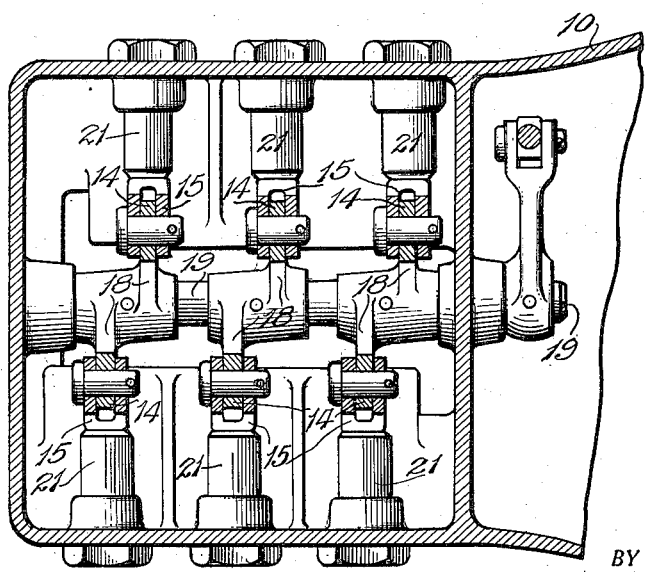
Figure 7 is a sectional view taken on the line 7—7 of Figure 1.

It will be noted from Figures 1, 2 and 6 that I have provided two bands for each brake drum and that these bands are anchored at opposite sides of the transmission housing 10. A seperate set of arms 15 and operating cams 18 are provided for each band which pair of cams are operated simultaneously through suitable mechanism to release both bands of each pair at the same time.

Figure 3:
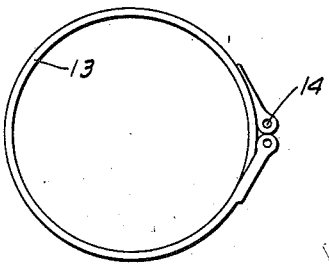
Figure 3 shows the free position of one of my transmission bands when removed from the transmission, showing the position that the band assumes when not expanded by its brake drum or operating mechanism.

Referring to Figure 3, I have shown the free position of my improved brake band when removed from the transmission whereby it may be seen that the band when free assumes a position with the eyes 14 practically together. At Figure 4, I have shown the position of the band where the ends are pulled apart thereby tensioning the band. It is preferable to grind the inside diameter of the band while in this position to the exact diameter of the brake drum with which it is to be used so that when the band is placed around this drum it will contract from its own tension and tightly grip the drum. Referring to Figure 5, the disengaged position of the band is shown wherein the eyes 14 are separated a considerable distance, thereby providing clearance between the brake drum and the band.

Figure 4:
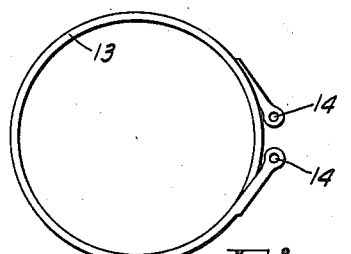
Figure 4 shows the position in which the band is held while it is being ground to the diameter of the transmission brake drum.
Figure 5:
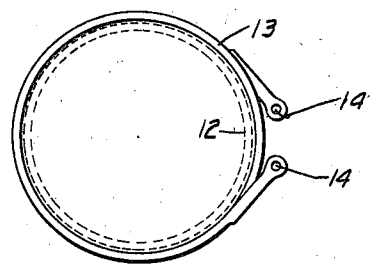
Figure 5 shows the disengaged position of the transmission band, its ends being separated to allow free rotation of the enclosed brake drum.

The feature of perhaps the greatest importance in connection with this device arises for the reason that sufficient tension is stressed in the band, when it is brought to the position shown in Figure 4, to grip the brake drum independently of any auxiliary force. This tension does not need to be great due to the energizing action of the three wraps of the band around the drum. Such bands in use have shown that a twenty-five pound stress on the ends of the band will resist the action of 2000 pounds torque which is ample for the ordinary automobile transmission. Due to the small movement of the eyes 14 between the positions shown in Figures 4 and 5, corresponding to the engaged and released positions of the band, the twenty-five pound pressure which must be counteracted to disengage the band may be reduced through suitable leverage to a negligible amount on the shift lever.

I have provided an anchor 21 for each of the arms 15 so that when they are spread to their released position one of these anchors may take the torque from the band thereby allowing the other arm free action to apply the energizing pressure to the drum. If the cams 18 were to act as anchors for the band no energizing effect could be obtained thereby as the force resisting the torque of the drum would tend to disengage the band. In the structure shown the friction resisting the brake torque tends to wrap the band more tightly around the drum thereby positively holding the drum against rotation.

Among the many advantages arising from the use of my improved device it may be well to mention that these bands positively stop the brake drum with no effort whatever by the operator, and that due to the energizing action of the bands, very little effort is required to disengage the bands from the drum. Further, by insuring a uniform clearance between the band and the drums when the bands are in their released position, no drag is imparted to the transmission even though the clearance between the drum and bands is very small. Thus, the effort required to release the band may be reduced through suitable leverage to a negligible amount on the operating lever.

Some changes may be made in the arrangement, construction, and combination of the various parts of my improved device without departing from the spirit of my invention, and it is my intention to cover by my claims such changes as may reasonably be included with the scope thereof.

I claim as my invention:

1. In a brake band and actuating mechanism therefor, a resilient band having a plurality of wraps around its brake drum, said band being so stressed that it will wrap itself into locking engagement with the drum independently of any auxiliary pressure, a plurality of stops disposed around said band, and means for spreading the ends of said band and forcing same into contact with said stops to thereby centralize the band in its released position.

2. In a brake band and actuating mechanism therefor, a resilient band having a plurality of wraps around its brake drum, said band being internally stressed so that it will wrap itself into locking engagement with the drum independently of any auxiliary pressure, a housing disposed around said band, said housing having a plurality of stops extending inwardly therefrom to position adjacent to the periphery of said band, and means for spreading the ends of said band and forcing same into contact with said stops to thereby centralize the band in its released position.

3. A transmission having a friction drum therein which is adapted to be held from rotation to effect one of the speed ratios therein comprising, a transmission housing, a resilient band disposed within said housing and coacting with said drum through a sufficient circumferential distance to energize the band, said band being internally stressed so as to urge itself into locking engagement with said drum, a pair of arms pivotally secured in said housing in position adjacent to said drum, the free ends of said arms being secured to the respective ends of said band, operable means adapted to actuate said arms and thereby actuate said band to its released position, and a pair of stops fixed in said housing in position to coact with said arms, one of said stops forming an anchor for one arm when said means actuate the other of said arms.

4. A transmission, as claimed in claim 3, wherein said band is formed as a metallic spiral which is internally stressed so as to wrap itself into locking engagement with the drum independently of any auxiliary pressure.

5. A transmission, as claimed in claim 3, wherein said operable means comprise a cam which is disposed between said arms, and which functions to positively release said band.

6. A transmission, as claimed in claim 3, wherein said band is formed as a metallic spiral which is internally stressed so as to wrap itself into locking engagement with the drum independently of any auxiliary pressure, and wherein said operable means comprise a cam which is disposed between said arms, said cam functioning to positively release said band.

EUGENE J. FARKAS.